United States Patent [19]

Tezuka

[11] Patent Number: 4,559,276

[45] Date of Patent: Dec. 17, 1985

[54] CONCRETE REINFORCING STEEL FIBERS

[75] Inventor: Yoshitomo Tezuka, Hachioji, Japan

[73] Assignee: Aida Engineering Ltd., Sagamihara, Japan

[21] Appl. No.: 385,916

[22] Filed: Jun. 7, 1982

[30] Foreign Application Priority Data

Mar. 3, 1982 [JP] Japan .............................. 57-33228

[51] Int. Cl.[4] .................................................. C04B 31/18
[52] U.S. Cl. ...................... 428/599; 428/600; 428/923; 106/99
[58] Field of Search .............. 106/99; 52/659, 720; 264/271.1; D25/98; 75/251; 428/599, 600, 602, 603, 605, 606, 612, 544, 923

[56] References Cited

U.S. PATENT DOCUMENTS

| | | | |
|---|---|---|---|
| 1,646,396 | 10/1927 | Field .................................. | 428/605 |
| 2,431,294 | 11/1947 | Dulmage ............................ | 241/279 |
| 3,504,516 | 4/1970 | Sundberg ........................... | 72/203 |
| 3,728,211 | 4/1973 | Ball .................................... | 106/99 |
| 3,953,953 | 5/1976 | Marsden ............................. | 106/99 |
| 4,050,949 | 9/1977 | Lundgren ........................... | 428/603 |
| 4,121,943 | 10/1978 | Akazawa ............................ | 106/99 |
| 4,298,660 | 11/1981 | Nakagawa .......................... | 106/99 |

*Primary Examiner*—L. Dewayne Rutledge
*Assistant Examiner*—John J. Zimmerman
*Attorney, Agent, or Firm*—Armstrong, Nikaido, Marmelstein & Kubovcik

[57] ABSTRACT

Steel block is directly subjected to cutting to produce steel fibers for reinforcing concrete, which are flat within determined conditions that if length of the steel fiber is L, width is W, thickness is t and flat index is N, and if L is 20 to 40 mm, N=W/t=7 to 9, wherein W=1.5 to 2.5 and t=0.2 to 0.3 mm.

5 Claims, 5 Drawing Figures

FIG_1
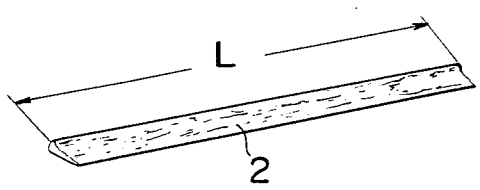
FIG_2
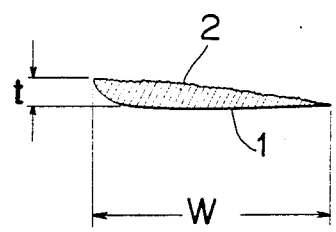
FIG_3
FIG_4
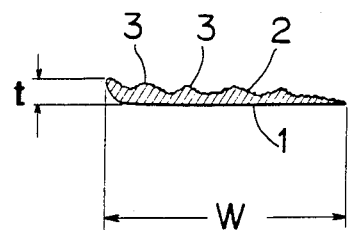
FIG_5
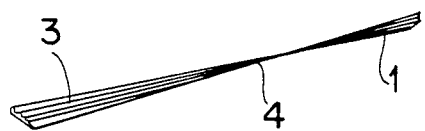

CONCRETE REINFORCING STEEL FIBERS

BACKGROUND OF THE INVENTION

The present invention relates to steel fibers for reinforcing concrete, and more particularly to improvement of the steel fibers which are produced by directly cutting steel block.

BRIEF DESCRIPTION OF THE INVENTION

In general, short steel fibers are mixed into liquid concreate in order to improve brittleness with respect to tension of the concrete. Various kinds of the steel fibers are known, and their representative types are (1) cut wire fiber—made by cutting the rolled and drawn steel wire in determined length (2) sheared fiber—made by cutting with a rotary edge the coiled material of slitting the cold rolled steel sheet (3) melt extraction fiber—made by rotating the water cooled disc or the surface of molten steel and instantaneously solidifying and splashing the molten steel by centrifugal force (4) cut fiber—made by cutting a thick steel plate or block.

The concrete reinforcing steel fiber (called as "steel fiber" or "fiber" hereinafter) is required in the mass productivity at economical cost on account of much use, proper strength (tensile strength) and suitable adhesive strength to the concrete. In this regard, the above mentioned steel fiber (3) is cheap in the production cost because of direct making from the molten steel but has problem on the practical use due to difficulties in controlling the temperature of the molten steel and the surface control, and further has inconvenience of inferior property concerning strength.

The steel fibers (1) and (2) are superior in the strength characteristics to the fibers (3), but are expensive since the raw materials are high in processing degree, but are unsatisfactory in the adhering strength because of circular or rectangular shapes in cross section. For supplementing these weak points, the fibers are partially given unevenness by means of physical manners or bent at the both ends, but notwithstanding such manners, satisfactory effects could not be brought about since lubricant used at production of the raw material remains on the fiber surfaces. When such fibers are scattered into the concrete they make causes of cracking in the concrete due to so called notch effect.

On the other hand, since the cut fibers (4) are made of the raw material such as the continuously cast slab of the low processing degree, the production cost is economical and being rough as non-notched on the surface, the adhering strength is satisfactory, and having been effected with large elastic deformation during production, the strength is sufficient due to work hardening. Therefore, this cut fiber (4) is as a whole excellent to those fibers (1), (2) and (3).

In addition to the above mentioned characteristics to be demanded to the steel fibers, workability should be taken into consideration. The workability means herein that fluidity of the fiber is smooth at packing, wrapping or taking out, the fibers do not make mass or lump, they are uniformly scattered when mixing with the cement, aggregate and others in the mixer, and that they are not bent or broken during mixture.

Concerning the workability, the steel fibers (1),(2),(3) get caught one another when packing into or taking out from the box, particularly easily making so-called fiber balls. For solving such conditions, troublesome disentangling process is required, or special means as a separator should be often prepared on practice. Further, the mixing load is large due to bad dispersion, so that the mixing time is taken long, and clogging is caused in the machine or hose, resulting in loss of time and process for setting or disassembling. Since the dispersion in the concrete is not uniform, the required strength could not be accomplished.

The steel fiber (4) is indeed better than those (1),(2), (3) in the production cost, the quality or others, but in the actual practice there are the steel fibers which are satisfied in the reinforcing strength but not preferable in the workability, or vise versa. That is, being too thin or too long, bending or breaking are caused to make mass, lump and other inconvenience so that the strengthening effect is extremely reduced, otherwise being too fat in cross section, the adhesive property is made down so that the steel fibers precipitate down to the lower part of the concrete.

OBJECT OF THE INVENTION

The present invention is to remove difficulties as mentioned above in the existing steel fibers.

A basic object of the invention is to provide the steel fibers for reinforcing the concrete, which are as required in the reinforcing effect and excellent in the workability.

Another object of the invention is to provide the steel fibers which are smooth in the fluidity without getting caught in one another, and easy in packing or wrapping, and may be thrown in the lump without arranging the special machine such as the separator. Since the fibers are rapidly scattered uniformly and bring about high workability and working efficiency, the load of the mixer is low to reduce the power.

A futher object of the invention is to provide the steel fibers which have spring property. If the fiber is given bending moment while mixing or taking out into the nozzle or hose, it returns to original shape and does not make the fiber ball nor clog the nozzle or hose.

Another object of the invention is to provide the steel fibers which are excellent in the adhesive property due to the balance between the smooth surface and the rough surface, thereby to increase the reinforcing effect. The steel fiber increases the rigidity and fluidity by controlling the shapes in size, instead of making aspect ratio small, so that the weight is not unnecessarily increased and the fibers may be much mixed per concrete unit, and the concrete or the mortal product of high strength can be produced at high efficiency.

SUMMARY OF THE INVENTION

For accomplishing the above mentioned object, the inventor has made studies of relationship between the shape, size, reinforcing effect and workability. With respect to this kind of the steel fibers, one of the most important characteristics is the tensile strength (i.e., the strength which does not cause breakage of tension at breaking the concrete reinforced by mixing with the steel fibers). The prior art gets the tensile stress $\sigma f$ in $\tau \cdot l/d$, i.e. in the product of the adhering strength of the concrete and the aspect ratio, and regards the aspect ratio as parameters of shapes and sizes of the steel fibers in order to determine the length l, cross sectional area and diameter.

However, depending upon the inventor's investigations, it has been proved that the workability and the reinforcing effect could not be matched satisfactorily by the parameter of the aspect ratio and the shape-size thereon.

As a result, the inventor has formed that the reinforcing effect and the workability could be both satisfied by the fact that the basic shape of the cut steel fiber was flat, and the most effective was that the degree of flatness was present in a certain range.

The steel fiber is made by cutting and is present in the conditions of a length L between 20 mm and 40 mm, a flat index N (width (W)/thickness (t)) between 7 and 9, W=1.5 to 2.5 mm and t=0.2 to 0.3 mm.

In such a manner fluidity of the fiber per se is excellent and advantageous while wrapping, packing or taking out smoothly without making balls. Further, the steel fibers are uniformly scattered into the liquid concrete. The fibers are given moderate hardness, elasticity and required spring constants. If strong bending moment acts thereon, the fiber easily recovers to the original shape due to the elasticity without being bent or broken and clogging in the hose, and those have excellent adhesion to the concrete without sinking down in the concrete.

BRIEF DESCRIPTION OF THE DRAWING

FIG. 1 is a perspective view showing one example of the steel fiber according to the invention, FIG. 2 is an enlarged cross sectional view of the same, FIG. 3 is a perspective view showing another example of the invention, FIG. 4 is an enlarged cross sectional view of the same, and FIG. 5 is a perspective view showing a further example of the invention.

DETAILED DESCRIPTION OF THE INVENTION

FIGS. 1 to 4 show examples of the steel fibers according to the present invention, which are as a whole flat, having a cross section normal to the axial direction that is substantially crescent-shaped (FIGS. 1 and 2) or mountain shapes in the same (FIGS. 3 and 4). The fiber has a curve in width of mirror face 1 and a rough face 2 as pear skin as seen in FIG. 2 or a face formed with furrows or wrinkles 3 running in length on the rough face 2, said furrows forming said mountain like shapes, as seen in FIG. 3. FIG. 5 shows another example of the invention which is twisted in axial direction of the fiber.

Each of the steel fibers as mentioned is produced by cutting a steel block on a surface thereof such as a continuously cast slab by means of a rotary cutter having a plurality of cutting edges, in right angle with the axial line of the fiber. If the cutting direction were along the axial line of the fiber, notches would be formed in right angle with the axial line of the fiber, that is, in the width, and the reinforcing effect would be decreased.

The steel fiber of the invention depends upon such cutting and is flat in shape satisfying under mentioned conditions where the most importance is present.

(1) L=20 to 40 mm (2) N=W/t=7 to 9, herein W=1.5 to 2.5 mm and t=0.2 to 0.3 mm, L is the length of the fiber, W is the width, t is the thickness (the maximum thickness) and N is the flat index.

A basic condition of the fiber according to the invention is that the entire body is flat. Generally, it has been considered that the steel fiber was acicular or needle shaped as seen in the chopped fiber or cut wire fiber. The acicular shape means that the cross section is circle or each of the sides is the same length. The existing cut fiber follows this conception, and it was better that the width and the thickness were equal as fat as the above said fibers.

However, through the inventor's studies, such fiber is relatively small in the area of the smooth face and large in the rough parts. Accordingly, the fiber increases resistance in touching one another and easily gets caught in addition to the shape of the bar. Further, being needle shape, it lacks restoration with respect to bending to cause decreasing of the workability owing to forming of the fiber balls and the reinforcing effect. In order to improve these matters the conventional technique has made the cross section large or made the aspect ratio small, but since the steel fibers are mixed into the concrete on a standard of weight of the fiber, the mixing amount per the amount of the unit concrete is decreased, whereby the adhering strength per one piece of the steel fiber is decreased so that the reinforcing effect could not be much expected. If the mixing amount were increased, the fibers get caught one another to make the fiber balls and do not form uniformly mixed condition due to sinking down.

In view of such practices, the present invention specifies that the basic shape of the steel fiber is flat, especially the smooth face 1 is a long side in the cross section, wherein the length L is within 20 to 40 mm. Length less than 20 mm is too short and if the above condition (2) were satisfied, the adhesion would be lowered and desired reinforcing effect as the drawing resistance could not be expected. Length more than 40 mm makes the adhesion excellent and increases the drawing resistance, but would decrease rigidity of the fiber owing to the relation between the width W and the thickness t, and the fibers lack firmness so that they are broken or bent when packing or mixing, or they make bridgings in the nozzle, hose and others when blowing.

Thus the length is 20 to 40 mm. However, the characteristics of the desired strength for the reinforcing steel fiber and the workability could not be satisfactorily harmonized if the fiber were only flat. That is, if being too much flat, the fiber would be weakened when it is agitated in the concrete because hardness is wanted. This fact easily makes the fiber ball, and lacks the reinforcing effect since it is weak in the tensile strength. Contrarily, if being little in flatness, there would arise problems in the workability and the reinforcing effect.

The inventor carried out experiments for providing suitable flat index. Raw material was a continuously cast slab of low carbon steel (C: 0.04%, P: 0.005%, S: 0.006%, Si: 0.04%, Mn: 0.30%, the rest being Fe and unavoidable impurities). This slab was subjected to a plane milling cutter having cemented carbide chips to produce flat steel fibers whose basic shapes were as shown in FIG. 3 having L=30 mm, W=2 mm and t being eight kinds (A-H).

TABLE 1

| Kinds | t (mm) | N | Tensile Strength (Kg/cm²) | a | | | | |
|---|---|---|---|---|---|---|---|---|
| | | | | b | c | d | e | f |
| A | 0.10 | 20 | 70 | narrow | clod | Δ | present | present |

TABLE 1-continued

| Kinds | t (mm) | N | Tensile Strength (Kg/cm²) | a b | c | d | e | f |
|---|---|---|---|---|---|---|---|---|
| B | 0.15 | 13 | 80 | " | " | ○ | present | " |
| C | 0.20 | 10 | 89 | middle | " | ○ | present | present (small) |
| D | 0.22 | 9 | 91 | wide | uniform | ◉ | absent | absent |
| E | 0.25 | 8 | 94 | " | uniform | ◉ | absent | " |
| F | 0.27 | 7.4 | 97 | " | uniform | ◉ | absent | " |
| G | 0.30 | 6.7 | 100 | middle | clod | △ | absent | " |
| H | 0.35 | 5.7 | 102 | narrow | " | △ | absent | " |

NOTES:
◉: very good,
○: good,
△: maldistributed
a: scattering,
b: spread,
c: dipersion,
d: fluidity at mixing,
e: bending of the fiber,
f: fiber ball With respect to "scattering" in Table 1, the steel fibers of said kinds were at random 200 pieces filled in the box, and the box was opened under the windless condition at height of 1 m from the ground, and then the spreading and dispersion were measured. For mixing into the concrete, the fibers of the same number were mixed under the constant rotation of a ball like mixer, the mixture was Vf1% and W/C=50%.

As apparently from Table 1, when the flat index is too large, that is, the thickness is too thin, the tensile strength was decreased and the dispersion is not preferable so that the fiber ball is easily made. When the flat index is small (large thickness), the tensile strength is sufficient but the scattering is not preferable. On the other hand, the fibers having the flat index within 7 to 9, i.e., D, E, F are excellent in the strength and scattering. After addition to the concrete, those are instantly scattered three-dimensionally and mixed with the aggregates and the cement rapidly without bending or breaking and making the fiber balls. Thus it is seen that the flat index is the important factor as the reinforcing steel fiber.

The flat index gives big influence to the spring property and the most suited range is N=7 to 9. In order to observe this effect, investigation was carried out on the steel fibers D and E by securing its one end, positioning a fulcrum having curvature of 5R under the securing portion, giving determined displacement (angle θ) and measuring residual stress (angle θ') after releasing. θ=10° to 30° resulted θ'=0°, θ=45° resulted within θ'=2°, θ=60° resulted within θ'=10°, and θ=90° resulted within θ'=30°. On the other hand, if the flat index was more than 9, the residual stress was large as θ=10° to 30° resulted θ'= around 20°. Conversely, if the flat index was less than 7 and when θ was small, θ' was also small, and when θ was large, the residual stress increased rapidly, and the spring back ceased. In the existing products (0.75 mm×0.75 mm) θ=10° showed θ'=3°, θ=30° showed θ'=25°, θ=60° showed θ'=55°, and θ=90° showed θ'=85°.

For reason of the above circumstances, the invention specified the flat index, but only with the flat index, desired results were not always obtained, since the combination of W and t was endless. The inventor made flat steel fibers of various kinds of W and t under the condition of L=30 mm and the flat index 7 to 9. Table 2 shows results of tests thereon.

TABLE 2

| | W (mm) | t (mm) | N | g h | i | k | j l | m | n |
|---|---|---|---|---|---|---|---|---|---|
| I | 1.3 | 0.16 | 8.12 | 70 △ | △ | Yes | | maldistributed | Yes |
| J | 1.4 | 0.2 | 7.0 | 77 △ | △ | " | | maldistributed | " |
| K | 1.4 | 0.18 | 7.77 | 73 △ | △ | " | | maldistributed | " |
| L | 1.4 | 0.16 | 8.75 | 71 △ | △ | Yes (small) | | maldistributed | " |
| M | 1.5 | 0.21 | 7.14 | 80 ◉ | ◉ | No | | uniform | No |
| N | 1.6 | 0.20 | 8.0 | 81 ◉ | ◉ | " | | " | " |
| O | 1.5 | 0.18 | 8.3 | 74 ○ | ○ | " | | almost uniform | " |
| P | 2.0 | 0.21 | 7.14 | 89 ◉ | ◉ | " | | uniform | " |
| Q | 2.0 | 0.25 | 8.0 | 94 ◉ | ◉ | " | | " | " |
| R | 2.0 | 0.22 | 9.09 | 92 ◉ | ◉ | " | | " | " |
| S | 2.4 | 0.30 | 8.0 | 103 ◉ | ◉ | " | | " | " |
| T | 2.6 | 0.37 | 7.02 | 109 ○ | ○ | Yes (small) | | some sinking | " |
| U | 2.6 | 0.32 | 8.12 | 106 ○ | ○ | Yes (small) | | some sinking | " |
| V | 3.0 | 0.37 | 8.10 | 111 △ | △ | Yes | | some sinking | " |
| W | 3.4 | 0.42 | 8.09 | 114 △ | △ | " | | some sinking | " |

NOTES:
◉: very good,
○: good,
△: bad,
g: characteristic of sole fiber,
h: tensile strength (Kg/cm²)
i: scattering,
j: mixing characteristic of fiber,
k: scattering speed,
l: fiber ball,
m: dispersion,
n: bending of the fiber It is seen from Table 2 that W should be at least around 1.5 mm as an absolute value which is relative with the smooth surface. If the area of the smooth surface were too small, the fluidity (scattering) would be given bad influence. When W is 1.5 mm, the area of the smooth surface is around 30 mm² if the fiber is the minimum of the specified length, and the contacting resistance of the fibers is made preferable. If W were less than 1.5 mm, the absolute value of t would be reduced due to the flat index in response thereto, and subsequently the rigidity is lowered to make the fiber weak and easily cause bending or breaking. The surface area is reduced to make the adhesion to the concrete insufficient and the tensile strength also insufficient. For avoiding these problems, it is necessary that t should be at least 0.2 mm as is seen from Table 2. Therefore, the lower limit of W is about 1.5 mm and the lower limit of t is about 0.2 mm.

It is seen from Table 2 that the maximum value of W is proper in 2.5 mm. This is why W is made large and t is made thick in response thereto, and the tensile strength is made high but the weight is increased due to increasing of the cross sectional area, and accordingly the mixing amount should be reduced so that the reinforcing effect could not be expected. If the amount of mixing were increased to heighten the reinforcing effect, clods would be made at supplying into the concrete and the fiber sink down during mixture. Further the production facility is large scaled including the milling cutter and the tools are expensive because of requiring strength so that the production cost is high.

M, N, P, Q, R, S have W between 1.5 to 2.5 mm and t between 0.2 to 0.3 mm, and are smooth in fluidity due to the flat shape balanced in the smooth surface and the rough face. In them, rigidity could be increased without changing the cross sectional area, and the spring property is as the plate spring and returns to the original shape even if the bending moment acts on while performing the mixture with the high tensile strength.

The following is an example of the present invention.

EXAMPLE

The steel fibers as shown in FIG. 5 were obtained from the continuously cast slab of low carbon of said chemical composition. The fibers of the same number were mixed into the concrete under the condition of the mixture of Vf1% and the water.cement ratio of W/C=50% and test pieces of 10×10×40 (cm) were made. The fine aggregate rate S/a 57%, the maximum size of the rough aggregate (crushed stones) was 15 mm and slamp 8±1 cm. Table 3 shows the test results of the bending strength, fluidity (uniformity of spread and spreading speed) and the fiber property at breaking.

TABLE 3

|   | L (mm) | W (mm) | t (mm) | N | o | p q | r |
|---|---|---|---|---|---|---|---|
| I | 30 | 2.0 | 0.25 | 8.0 | 97 | No bending | Invention |
|   | 40 | 2.0 | 0.25 | 8.0 | 102 | No bending | Invention |
|   | 50 | 2.0 | 0.25 | 8.0 | 104 | Bending | Comparative |
|   | 15 | 2.0 | 0.25 | 8.0 | 85 | No bending | Compara |
| II | 30 | 1.6 | 0.2 | 8.0 | 96 | No bending | Invention |
|   | 30 | 2.4 | 0.3 | 8.0 | 95 | No bending | Invention |
|   | 30 | 2.0 | 0.25 | 8.0 | 98 | No bending | Invention |
| III | 30 | 1.3 | 0.25 | 5.2 | 91 | No bending | Comparative |
|   | 30 | 2.6 | 0.25 | 10.4 | 92 | No bending | Comparative |
|   | 30 | 3.2 | 0.25 | 12.8 | 90 | Bending | Compara |
| IV | 30 | 2.0 | 0.38 | 5.2 | 89 | No bending | Comparative |
|   | 30 | 2.0 | 0.19 | 10.4 | Bending | Com- | |
|   | 30 | 2.0 | 0.16 | 12.8 | 88 | " | Comparative |

NOTES:
o: bending strength (Kg/m$^2$) of test piece,
p: fluidity,
q: property of fiber,
r: kinds In Table 3, I shows the effect of the length L, II shows the effect of W/t, III shows the effect of W, and IV shows the effect of t, respectively. If the length L were not proper, the balance of the strength ability and the workablity would be inferior though the other conditions are satisfied. Similarly, if W/t, W and t were outside of the invention, said two would be lowered. Being within the scope of the invention, said two would be superior.

What is claimed is:

1. A steel fiber for reinforcing concrete, said fiber being produced by directly cutting a steel block by means of a rotary cutting machine having a plurality of cutting edges, the axial direction of the steel fiber being at a right angle to the cutting direction, said fiber satisfying the following conditions:
L=20 to 40 mm,
N=W/t=7 to 9,
W=1.5 to 2.5 mm, and
t=0.2 to 0.3 mm;
wherein:
L is the length of the fiber,
N is the flatness index,
W is the width of the fiber in a cross section normal to the axial direction thereof, and
t is the maximum thickness of the fiber in a cross section normal to the axial direction thereof.

2. A steel fiber as defined in claim 1 having a rough surface and a smooth surface.

3. A steel fiber as defined in claim 2 which has a cross section normal to the axial direction of the fiber that is substantially crescent-shaped, the smooth surface forming the convex side thereof.

4. A steel fiber as defined in claim 2 in which said rough surface is formed by furrows running along the axial direction of the fiber.

5. A steel fiber as defined in claim 3 in which said rough surface is formed by furrows running along the axial direction of the fiber.

* * * * *